(12) United States Patent
Nagasawa et al.

(10) Patent No.: US 6,431,584 B1
(45) Date of Patent: Aug. 13, 2002

(54) AIR BAG APPARATUS

(75) Inventors: Norimasa Nagasawa, Yokohama; Masaya Kodama, Hiroshima, both of (JP)

(73) Assignee: Nifco Inc., Kanagawa-ken (JP)

( * ) Notice: Subject to any disclaimer, the term of this patent is extended or adjusted under 35 U.S.C. 154(b) by 0 days.

(21) Appl. No.: 09/910,941

(22) Filed: Jul. 24, 2001

(30) Foreign Application Priority Data

Jul. 25, 2000 (JP) ........................................ 2000-223823

(51) Int. Cl.⁷ ............................................... B60R 21/16
(52) U.S. Cl. .................................................... 280/728.2
(58) Field of Search ........................... 280/728.1, 728.2, 280/728.3, 730.2; 296/203.3, 146.6

(56) References Cited

U.S. PATENT DOCUMENTS 5,845,931 A * 12/1998 Nagy et al. ............... 280/728.3
6,082,761 A *  7/2000 Kato et al. ................ 280/730.2
6,371,512 B1 *  4/2002 Asano et al. ............. 280/730.2

FOREIGN PATENT DOCUMENTS

JP          9-254736          9/1997
JP          11-321520        11/1999

* cited by examiner

Primary Examiner—Eric Culbreth
Assistant Examiner—Faye M. Fleming
(74) Attorney, Agent, or Firm—Morrison & Foerster, LLP (57) ABSTRACT

The holding device for use in mounting a garnish on a front pillar has a pin member at the side of the garnish and a grommet member at the side of the front pillar. A leg portion of the pin member is inserted into a cylindrical portion of the grommet member. The leg portion has a first mounting engagement claw that is engaged with a first engagement portion of the cylindrical portion to hold the garnish in a given mounted state. The engagement of the first mounting engagement claw with the first engagement portion is released by means of expansion pressure of an air bag apparatus, while a second mounting engagement claw of the leg portion is brought into engagement with a second engagement portion of the cylindrical portion to prevent the pin member from coming off. At this time, a clearance is formed between the garnish and the front pillar, thereby developing an air bag into a cabin compartment of the vehicle through the clearance. By the rotation of the pin member relative to the grommet member, the engagement of the second mounting engagement claw with the second engagement portion is released, thereby allowing the pin member to be pulled out completely from the grommet member.

The holding device for mounting the garnish can be re-used after the operation of the air bag.

15 Claims, 12 Drawing Sheets

AIR BAG APPARATUS

TECHNICAL FIELD

The present invention relates to an air bag apparatus to be developed into a cabin compartment of a vehicle through a vehicle body panel and a garnish.

DESCRIPTION OF THE RELATED ART

An air bag apparatus for use with a vehicle is proposed, which is interposed between a vehicle body panel and a garnish and which permits the development of the air bag in the cabin compartment of the vehicle through a clearance formed forcibly between the vehicle body panel and the garnish due to the expansion pressure applied to the air bag to be developed upon operation of the air bag. Japanese Patent Laid-Open Publication Nos. 9-254,736 and 11-321,520 disclose each an air bag apparatus interposed between a vehicle body panel, including a roof side rail or a pillar, and the garnish mounted on the vehicle body panel with a holding device. The holding device mounted on and fixed to the garnish is inserted into a mounting hole formed in the vehicle body panel and an engagement portion formed in the holding device is allowed to come into abutment with a peripheral edge portion of the mounting hole, thereby preventing the holding device from coming off from the mounting hole. Further, the holding device is engaged with the mounting hole in an ordinary occasion in a state in which the garnish is disposed in the vicinity of the vehicle body panel, and the garnish can be displaced to some extent in the direction in which it is pulled out and released from the mounting hole, so as to be separated apart from the vehicle body panel upon receipt of the expansion pressure of the air bag.

The garnish of such a conventional air bag apparatus is structured, however, that it cannot be detached from the vehicle body panel simply by changing the depth of insertion of the garnish into the mounting hole formed in the vehicle body, after the garnish has once been mounted on the vehicle body panel, that is, after the holding device has once been mounted on the vehicle body panel, because the holding device cannot be detached from the vehicle body panel. Therefore, in order to detach the garnish from the vehicle body panel, for example, upon maintenance or exchanges of the air bag apparatus, the holding device has to be broken so that it cannot be reused.

SUMMARY OF THE INVENTION

Therefore, the present invention has been completed with the above situation involved in the conventional air bag apparatuses of the type as described above and has the object to provide an air bag apparatus that can assume a given mounted state in which the garnish for the air bag apparatus is located in the vicinity of the vehicle body panel and a separate state in which it is separated from the vehicle body panel to some extent. Further, the air bag apparatus enables the holding device to be reused upon attachment or detachment of the garnish to or from the vehicle body panel.

In order to achieve the above object, the present invention provides an air bag apparatus as claimed in claim 1, in which the air bag apparatus comprises an air bag disposed at a cabin compartment side of a vehicle body panel, a garnish disposed covering the air bag from the cabin compartment side, and a holding device disposed to hold the garnish so as to assume a first posture in which the garnish is located in a given mounted state in the vicinity of the vehicle body panel and a second posture in which a clearance through which the air bag can pass is formed between the garnish and the vehicle body panel in response to expansion pressure of the air bag, and in which the air bag is disposed expanding into the cabin compartment side from the clearance; wherein the holding device comprises a pin member and a grommet member, the pin member includes a first mounting engagement portion at which the pin member is detachably engaged with the garnish and a leg portion extending integrally from the first mounting engagement portion, and the grommet member includes a cylindrical portion disposed receiving the leg portion and a second mounting engagement portion formed integrally with the cylindrical portion and mountable on the vehicle body panel; wherein the leg portion includes a first engagement claw and a second engagement claw disposed at a relationship spaced apart in an axial direction of the leg portion; wherein the cylindrical portion includes a first engagement portion engageable with the first engagement claw of the leg portion in a state in which the leg portion is inserted deeply to assume the first posture, thereby preventing the leg portion from coming off from the cylindrical portion; wherein the cylindrical portion includes a second engagement portion engageable with the second engagement claw of the leg portion in a state in which the leg portion is inserted shallowly to assume the second posture, thereby preventing the leg portion from coming off from the cylindrical portion; wherein a force of engagement of the first engagement claw with the first engagement portion is set to become smaller than a force of engagement of the second engagement claw with the second engagement portion, and the engagement of the first engagement claw with the first engagement portion is released upon receipt of a force of separating the garnish apart from the vehicle body panel due to an expansion pressure on operation of the air bag apparatus while maintaining the second posture by engagement of the second engagement claw with the second engagement portion; and wherein the second engagement claw is detachably engaged with the second engagement portion.

According to the above embodiment, in an ordinary occasion, the leg portion of the pin member is situated in the first posture in which it is inserted deeply into the cylindrical portion of the grommet member and the garnish assumes a given (ordinary) mounted state in the vicinity of the vehicle body panel, and this first posture can be held by engaging the first engagement claw with the first engagement portion. As the pin member receives the external force in the direction in which it is being pulled out or released from the grommet member due to the force of the expansion pressure upon operation of the air bag apparatus, that is, upon development of the air bag, the engagement of the first engagement claw with the first engagement portion is released assuming the second posture in which the leg portion is inserted shallowly into the cylindrical portion and this second posture is maintained by engaging the second engagement claw with the second engagement portion. The second posture corresponds to the state in which a clearance is formed between the garnish and the vehicle body panel through which the air bag can pass, and the air bag is eventually developed into the cabin compartment of the vehicle through this clearance.

When the garnish is to be detached, the engagement of the second engagement claw with the second engagement portion is released and the pin member is then pulled out thoroughly from the grommet member. The pin member that has once been pulled out, however, can also be re-used for mounting the garnish on the vehicle body panel again, together with the grommet member mounted on the vehicle body panel. Preferred modes are described in claims 2 et seq on the basis of the above embodiment as a premise.

EFFECTS OF THE INVENTION

The invention as described in claim 1 provides an air bag apparatus with an air bag of a structure in which the air bag is developed through a clearance formed between the vehicle body panel and the garnish. In this structure, the state of mounting the garnish on the vehicle body panel can be changed between a closely mounted state and a clearance-formed state. Moreover, the garnish can be detached from the vehicle body panel by pulling the pin member out from the grommet member. In addition, the pin member once pulled out can be used again, together with the grommet member mounted on the vehicle body panel.

The invention as described in claim 2 provides a specific mode of releasing the engagement of the second engagement claw with the second engagement portion. In particular, this mode is directed to the way of releasing the engagement of the second engagement claw with the second engagement portion by utilizing the action in the direction crossing the direction of pulling the pin member out from the grommet member, such as the action of rotation, so that this mode is also preferred from the point of view of preventing an occurrence of the accident that the second engagement claw is disengaged from the second engagement portion in a careless manner.

In accordance with the present invention as described in claim 3, the second engagement claw can be disengaged from the second engagement portion by utilizing the elastic transformation of the second engagement claw and the pressing portion.

In accordance with the present invention as described in claim 4, there is provided a specific structure of each of the engagement claws with each of the engagement portions and a specific way of disengagement of the second engagement claw with the second engagement portion. In particular, the second engagement claw is gradually transformed elastically toward the inside in the radial direction of the cylindrical portion without difficulty by means of an inclining face formed on the pressing portion, in the process of pulling the pin member out from the grommet member.

The invention as described in claim 5 can preferably prevent the rotation of the second engagement claw relative to the pressing portion in a careless manner, thereby ensuring the sure maintenance of the second posture.

Further, the invention as described in claim 6 is preferred from the point of view of ensuring the maintenance of the second posture by engaging the second engagement claw with the second engagement portion for sure upon transferring the air bag from the first posture to the second posture by means of the expansion of the air bag.

Moreover, the invention as described in claim 7 is preferred in that the attachment and detachment of the pin member to and from the garnish can be effected with ease by utilizing sliding movement.

The invention as described in claim 8 can provide a specific structure that allows an easy attachment and detachment of the pin member to and from the garnish by utilizing the sliding movement.

In accordance with the invention as described in claim 9, it is preferred to render the leg portion more lightweight and higher in rigidity.

The invention as described in claim 10 presents the advantage that a careless rotation of the grommet member with respect to the vehicle body panel can be prevented when it is attempted to rotate the pin member relative to the grommet member.

In accordance with the invention as described in claim 11, it is preferred to automatically assume a state in which the rotation of the grommet relative to the vehicle body panel can be restricted, simply by inserting the cylindrical portion into the mounting hole of the vehicle body panel.

Further, in accordance with the invention as described in claim 12, the grommet member can be automatically fixed to the vehicle body panel simply by inserting the cylindrical portion of the grommet member into the mounting hole of the vehicle body panel.

The invention as described in claim 13 offers the advantage that the insertion of the pin member into the grommet member deeper to a predetermined position can be prevented for sure.

The invention as described in claim 14 can surely set the action of engagement of the first engagement claw to be smaller than the action of engagement of the second engagement claw.

In addition, the invention as claimed in claim 15 is preferred in that the pin member and the grommet member can be formed in a lightweight and less expensive manner.

DESCRIPTION OF THE INVENTION

Figure 1:
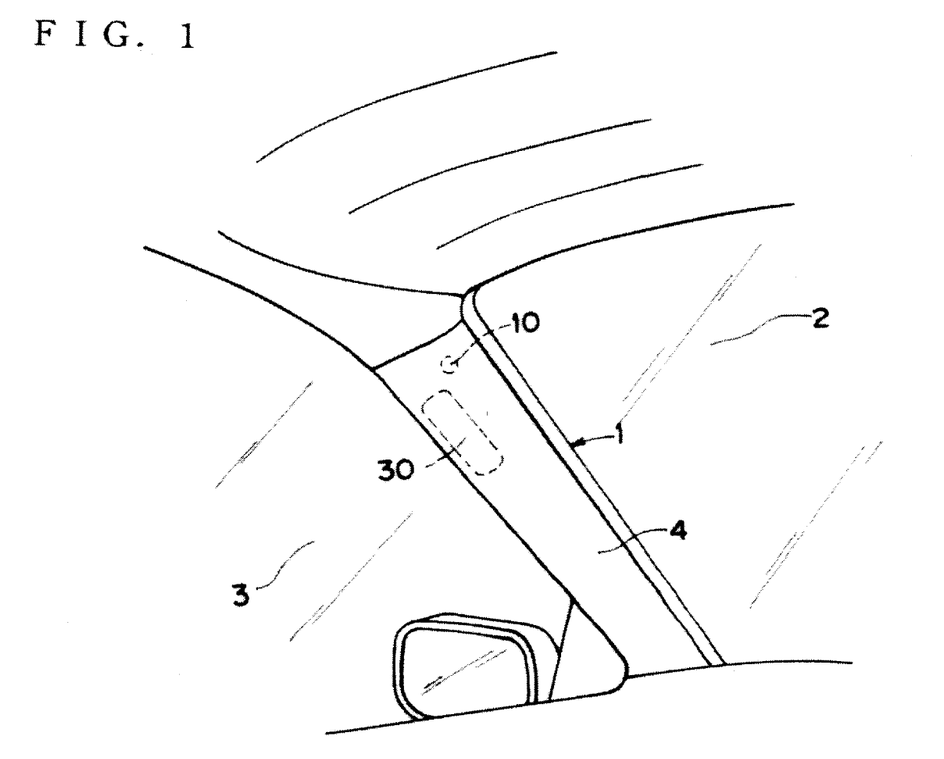
FIG. 1 is a perspective view showing an essential portion of a garnish for use with a front pillar, when looked from inside the cabin compartment of a vehicle, in accordance with an embodiment when applied to an embodiment of the present invention.
Figure 2:
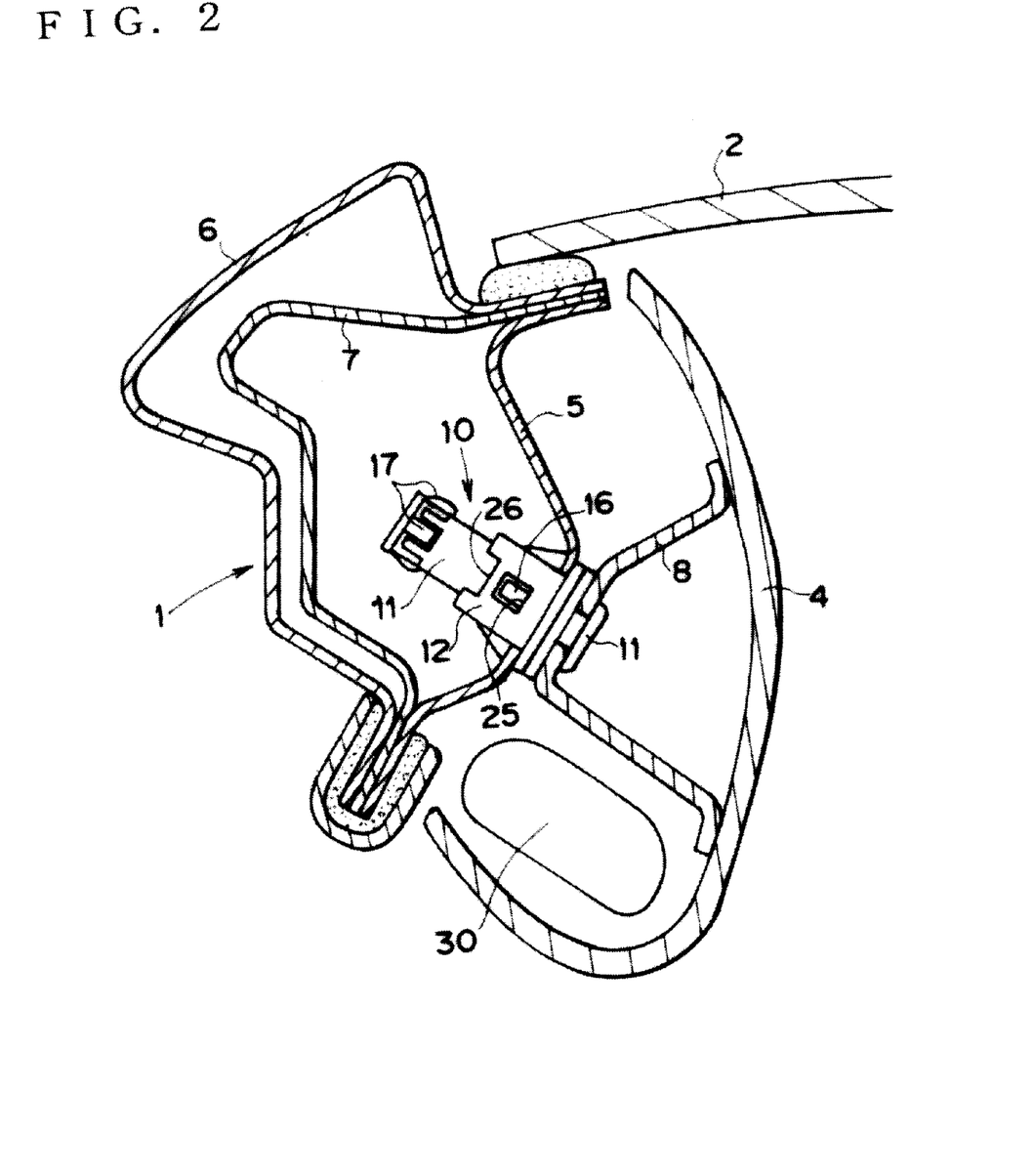
FIG. 2 is a view in section of a front pillar portion, showing a first posture in which the garnish is located in the vicinity of the front pillar.
Figure 3:
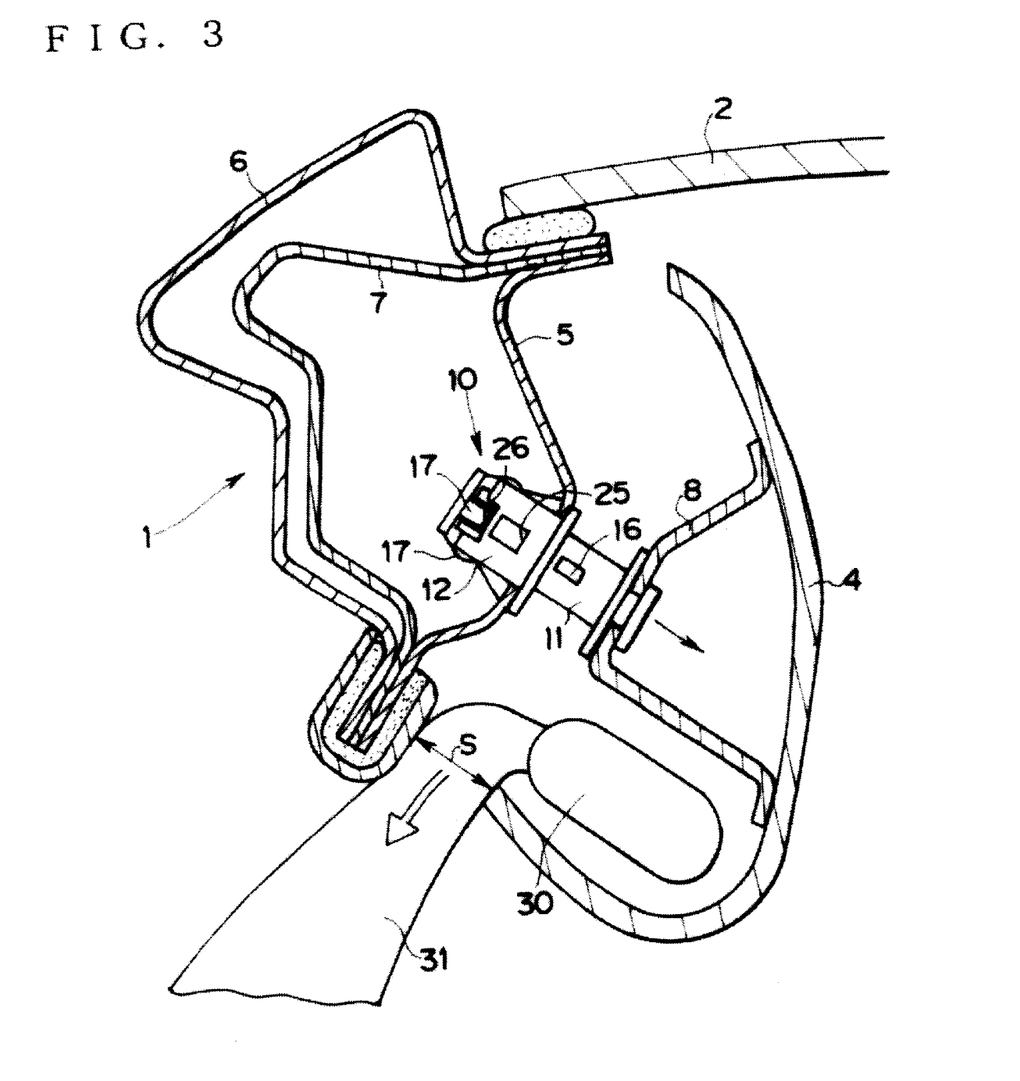
FIG. 3 is a view in section of the front pillar portion, showing a second posture in which a clearance is formed in a position in which the garnish separates somewhat apart from the front pillar.

As shown in FIGS. 1 to 3, reference numeral I denotes a front pillar, reference numeral 2 denotes a front window, and reference numeral 3 denotes a side window. On an inner face of the front pillar 1 as a vehicle body panel is detachably mounted a garnish 4 (referred to as an interior member or a trim member, too). The front pillar 1 is of a double structure in a closed section composed of an inner panel 5, an outer panel 6 and a reinforcement member 7.

The garnish 4 is detachably mounted on the front pillar 1 through a holding device 10. As will be described hereinafter, the holding device 10 may comprise a pin member 11 mounted detachably on a bracket 8 fixed to the inner face of the garnish 4 and a grommet member 12 mounted on the inner panel 5. The pin member 11 is inserted in the grommet member 12 and disposed so as to ensure a sure prevention from coming off therefrom at two stages of depth of insertion. FIG. 2 illustrates a first posture in which the pin member 11 is inserted deeply into the grommet member 12. In the first posture, the garnish 4 assumes a given mounted state in the vicinity of the inner panel 5. FIG. 3 illustrates a second posture in which the pin member 11 is inserted shallowly into the grommet member 12. In the second posture, there is formed a small clearance S between the garnish 4 and the inner panel 5.

Between the garnish 4 and the inner panel 5 is disposed an air bag apparatus 30 that comprises an air bag accommodated in a folded state in a casing and an inflator. As a side collision of the vehicle is detected, the inflator is exploded to expand and develop the air bag (the expanded air bag being indicated by reference numeral 31 in FIG. 3). Upon receipt of the expansion pressure from the air bag, the garnish 4 is transformed to some extent from the first posture of FIG. 2 to the second posture of FIG. 3 to form a clearance S between the garnish 4 and the inner panel 5, and the air bag 21 is developed through the clearance S into the cabin compartment of the vehicle (the air bag 21 being developed along the side window 3).

Figure 4:
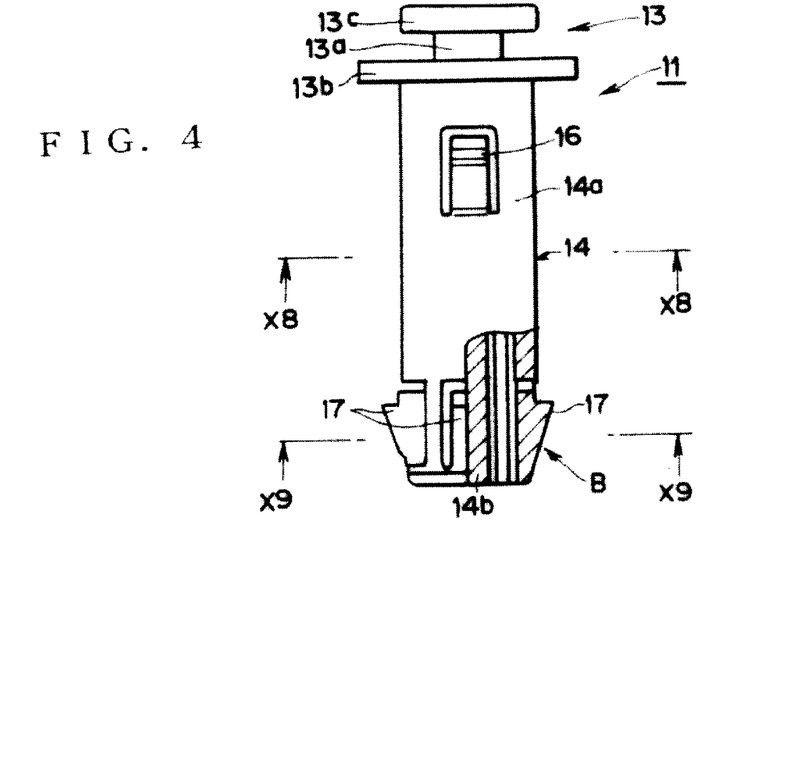
FIG. 4 is a side view in partial section showing a pin member.
Figure 5:
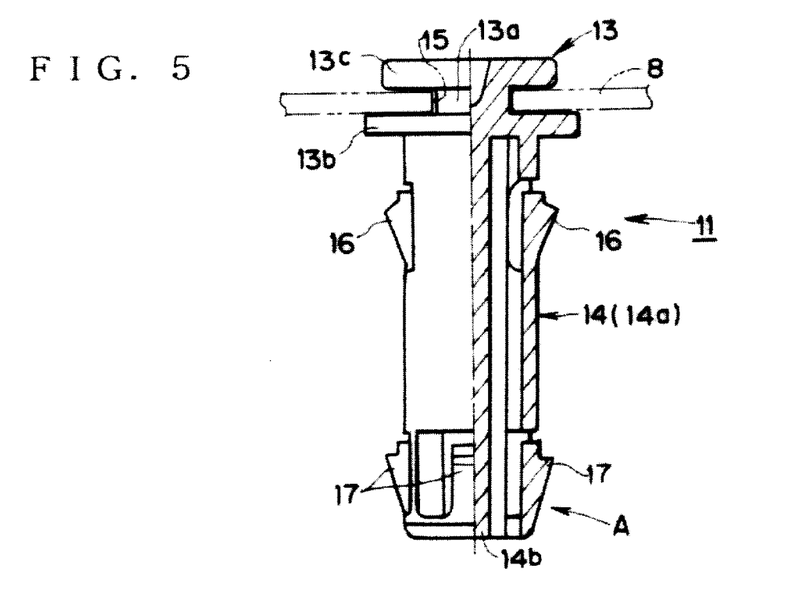
FIG. 5 is a side view in partial section showing the pin member, when deviated peripherally at 90 degree from the state of FIG. 4.
Figure 6:
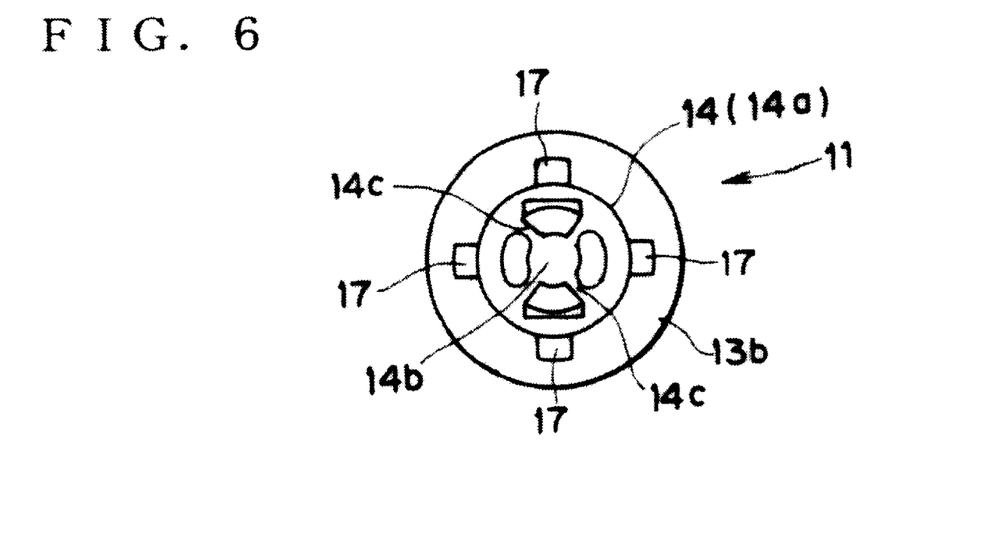
FIG. 6 is a bottom view showing the pin member, when looked from the top edge side of a leg portion.
Figure 7:
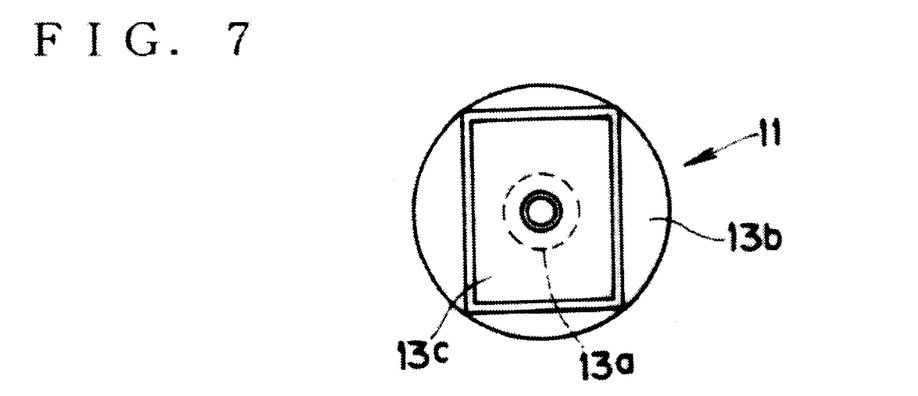
FIG. 7 is a top view showing the pin member, when looked from the side of a first mounting engagement portion.
Figure 8:
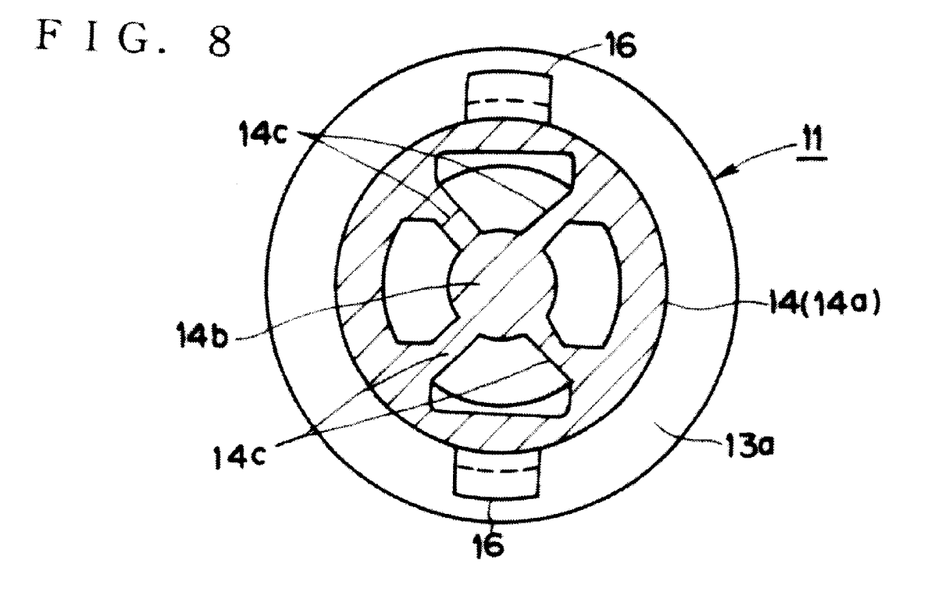
FIG. 8 is a view in section when taken along line X8—X8 of FIG. 4.
Figure 9:
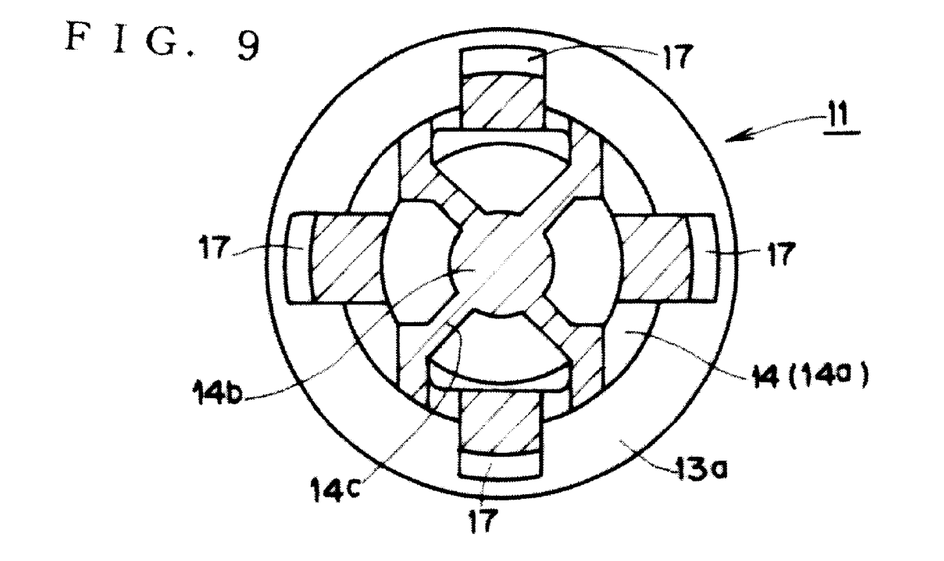
FIG. 9 is a view in section when taken along line X9—X9 of FIG. 4.
Figure 10:
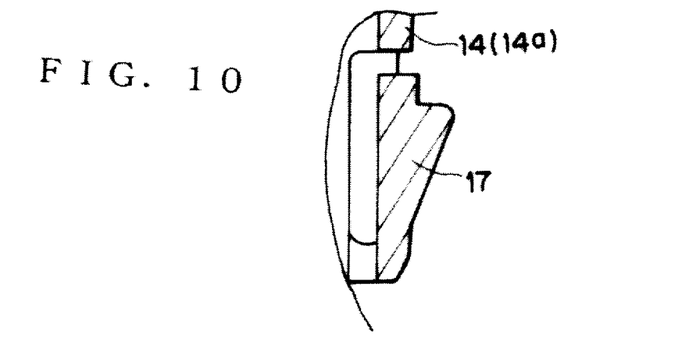
FIG. 10 is an enlarged view showing the portion indicated by arrow A of FIG. 5.
Figure 11:
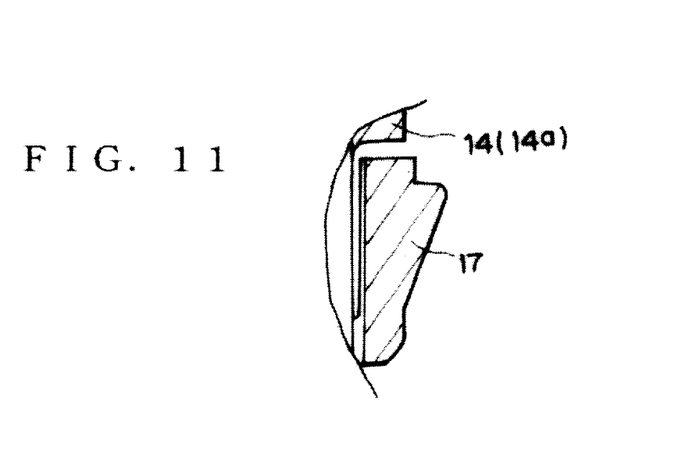
FIG. 11 is an enlarged view showing the portion indicated by arrow B of FIG. 4.

Then, a detailed description will be given regarding the holding device 10 with reference to FIGS. 4 et seq. FIGS. 4 to 11 illustrate the pin member 11. The pin member 11 may be of an integrally molded product made of a synthetic resin in its entirety and comprises a first engagement portion 13 acting as a mounting portion for a bracket 8 of the garnish 4 and a leg portion 14. The first engagement portion 13 is composed of a neck part 13a having a smaller diameter, a disc-shaped first flange part 13b formed on a one end portion of the neck part 13a, and a square-shaped second flange part 13c formed on the other end portion of the neck part 13a. The first flange part 13b is formed to become larger in diameter than the neck part 13a, and the smallest width of the second flange part 13c is set to become larger than the width of the neck part 13a.

Figure 12:
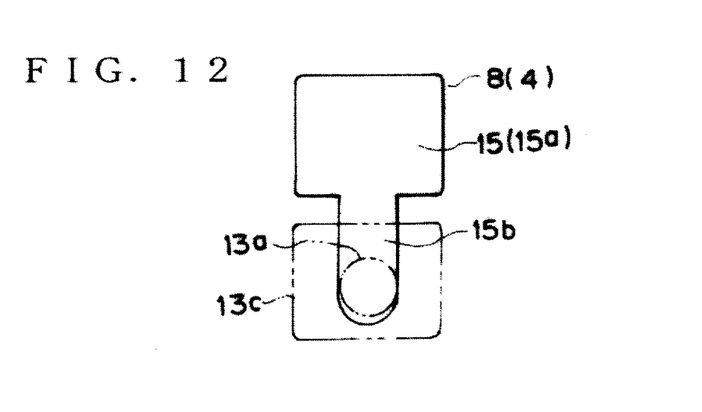
FIG. 12 is a view showing an example of a mounting hole at the garnish side on which to mount the pin member.
Figure 13:
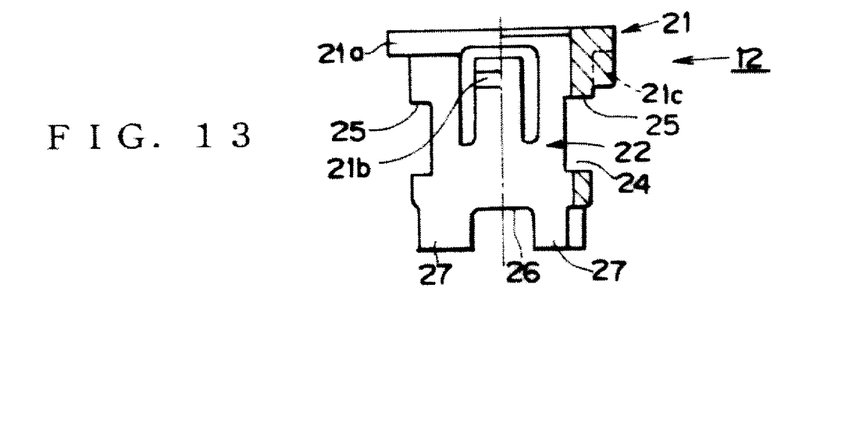
FIG. 13 is a partially sectional side view showing a grommet member.
Figure 14:
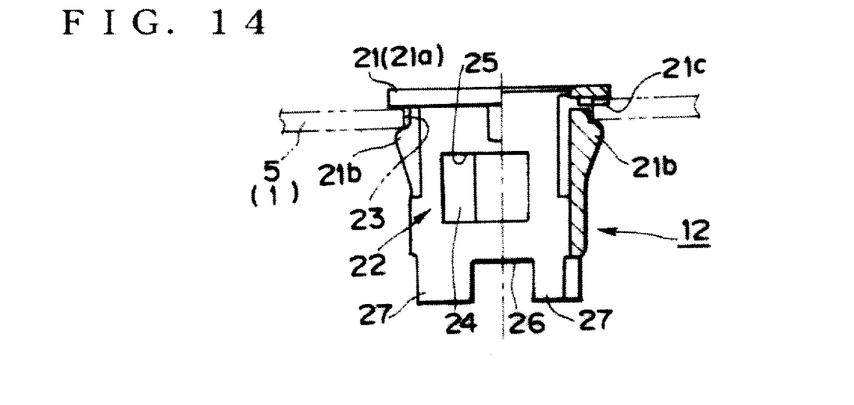
FIG. 14 is a partially sectional side view showing the grommet member when taken in a direction different from FIG. 13.
Figure 15:
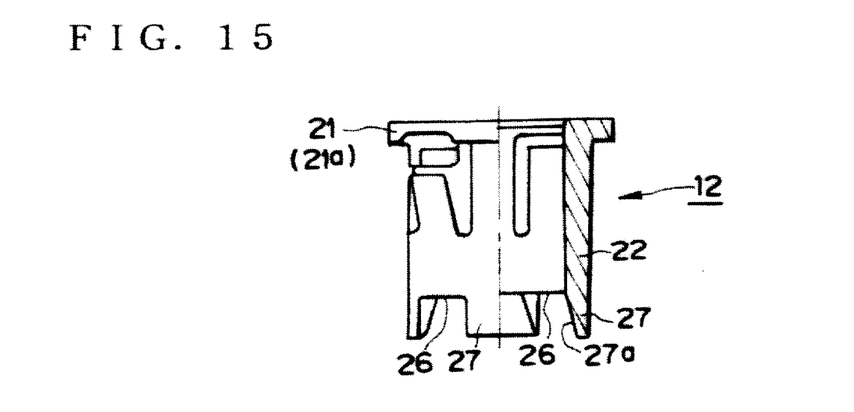
FIG. 15 is a partially sectional side view showing the grommet member, when taken in a direction different from FIG. 13 and FIG. 14 and when taken along line X15—X15 of FIG. 17.
Figure 16:
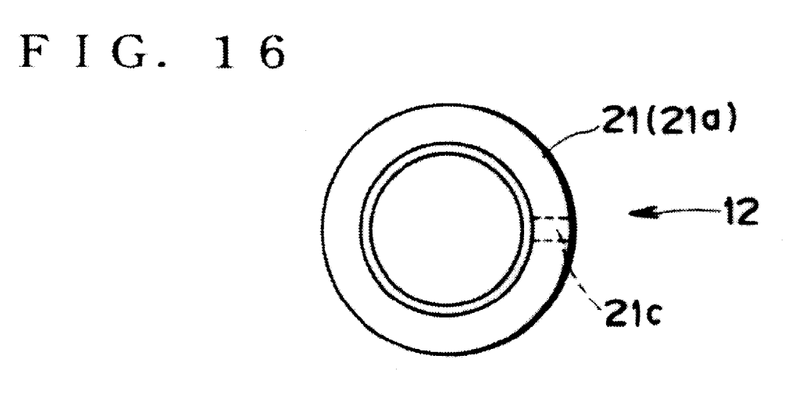
FIG. 16 is a top view showing the grommet member when looked from a second mounting engagement portion.
Figure 17:
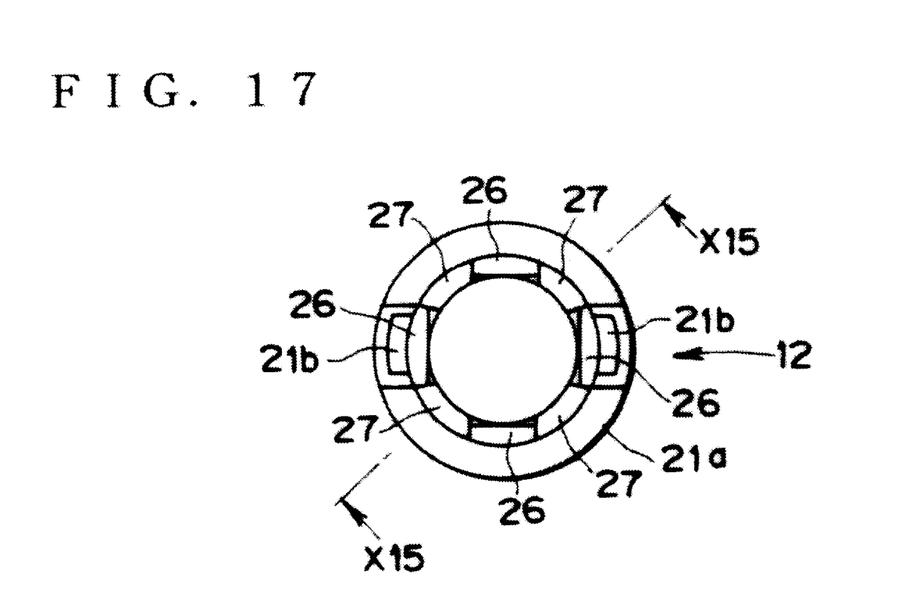
FIG. 17 is a bottom view showing the grommet member when looked from a top edge side of a cylindrical portion.
Figure 18:
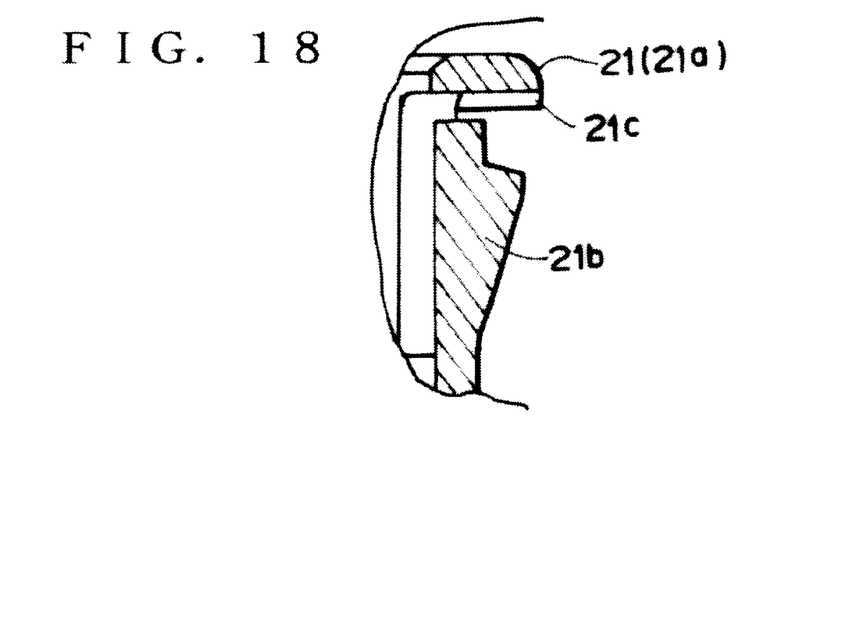
FIG. 18 is an enlarged view in section showing an essential portion of the second mounting engagement portion in the grommet member.

The pin member 11 is detachably engaged with a mounting hole 15 formed in the bracket 8 of the garnish 4 by means of the first engagement portion 13. More specifically, the mounting hole 15 includes a larger-sized cavity portion 15a having a shape and size corresponding to the second flange part 13c, and a groove portion 15b communicating with the larger-sized cavity portion 15a and extending in a slenderly elongated manner. The groove portion 15b is formed to have a diameter slightly larger than that of the neck part 13a. After the second flange part 13c is inserted into the neck part 13a, the neck part 13a is allowed to slide so as to locate the neck part 13a in the groove portion 15b, thereby assuming a mounted state (the neck part 13a and the second flange part 13c being indicated by dot-chain line in FIG. 12) in which a peripheral edge portion of the mounting hole 15 is clamped between the first and second flange parts 13b and 13c. The pin member 11 can be detached in the reverse procedures.

The leg portion 14 of the pin member 11 is formed to extend straight from the first flange part 13b. The leg portion 14 is comprised of a cylinder-shaped outer wall part 14a, a central shaft part 14b, and a plurality of rib parts 14c, each extending radially and connecting the outer wall part 14a to the central shaft part 14b. There is formed a hollow part among the outer wall part 14a, the central shaft part 14b and the plural rib parts 14c. The leg portion 14 is provided with a first engagement claw 16 and a second engagement claw 17. The first engagement claw 16 is located in the vicinity of the first flange part 13b and the second engagement claw 17 is located at a position remote from the second flange part 13b, that is, at a position in the vicinity of the end part of the leg portion 14. Each of the claws 16 and 17 is formed so as to protrude outwardly in the radial direction from the outer peripheral face of the outer wall part 14a in a free state in which no external force is applied and to be elastically transformable in the radial direction of the leg portion 14. Each of the claws 16 and 17 may be disposed in plural numbers in a relationship spaced apart at equal intervals in the peripheral direction of the leg portion 14. In this embodiment, two of the first engagement claws 16 are disposed and four of the second engagement claws 17 are disposed.

FIGS. 13 to 18 illustrate details of the grommet member 12. The grommet member 12 may be of an integrally molded product made of a synthetic resin in its entirety. The grommet member 12 is comprised of a second mounting engagement portion 21 acting as a mounting site on the front pillar 1 and a cylindrical portion 22 extending from the second mounting engagement portion 21. The second engagement portion 21 is comprised of a flange part 21a formed at a one end portion of the cylindrical portion 22, and a mounting engagement claw 21b formed on the side face of the cylindrical portion 22. The mounting engagement claw 21b is formed protruding to some extent outwardly in the radial direction of the cylindrical portion from the outer peripheral face of the cylindrical portion 22 and capable of being elastically transformable in the radial direction of the cylindrical portion 22. Moreover, the mounting engagement claw 21b may be disposed in plural numbers (a total number of two in this embodiment) at generally equal intervals in the peripheral direction of the cylindrical portion 22. A protrusion portion 21c for stopping the rotation is formed on the rear face of the flange part 21a constituting the side of the cylindrical portion 22.

Figure 19:
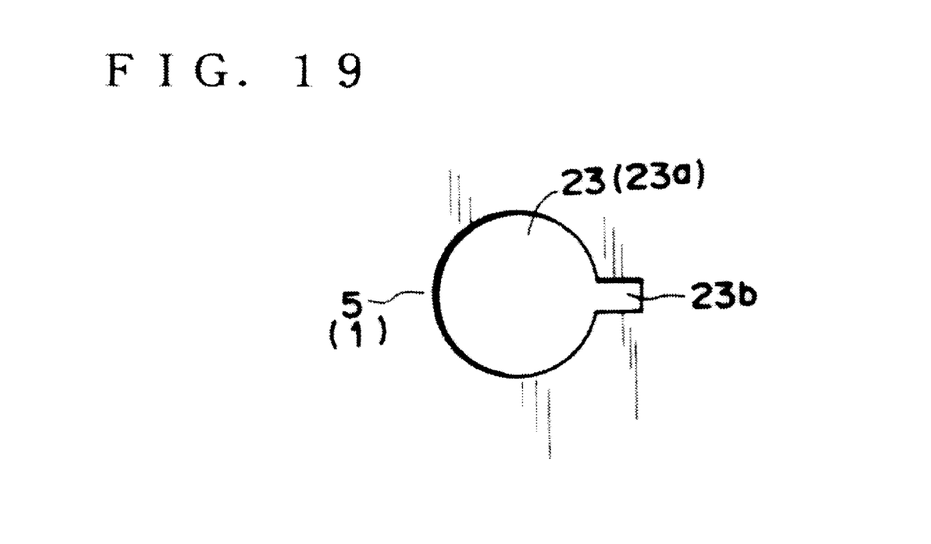
FIG. 19 is a view showing an example of a mounting hole at the vehicle body panel side on which to mount the grommet member.

As shown in FIG. 19, a mounting hole 23 is formed in the inner panel 5 to mount the grommet member 12 on the inner panel 5 by means of the second engagement portion 21. The mounting hole 23 is comprised of a main cavity portion 23a and a smaller-sized engagement cavity portion 23b communicating with the main cavity portion 23a. The main cavity portion 23a is in a circle form having a diameter slightly larger than the outer diameter of the cylindrical portion 22, and the engagement cavity portion 23b is formed having a diameter engageable with the protrusion portion 21c. In order to mount the grommet member 12 on the inner panel 5, the cylindrical portion 22 may be inserted into the main cavity portion 23a while aligning the protrusion portion 21c with the engagement cavity portion 23b. At this time, the mounting engagement claw 21b is forced to be elastically transformed inwardly in the radial direction of the cylindrical portion 22 upon passage through the main cavity portion 23a and elastically recovered immediately after it has passed through the main cavity portion 23a, thereby assuming a completely mounted state in which it clamps the inner panel 5 in association with the flange part 21a. The mounting engagement claw 21b can prevent the cylindrical portion 22 from coming off from the mounting hole 23, and the protrusion portion 21c can prevent it from rotating.

On the side face of the cylindrical portion 22 is formed a plurality (a total number of two in this embodiment) of opening portions 24 corresponding to the first engagement claws 16. A top edge part of each of the opening portions 24, that is, an inner peripheral edge part at the second engagement portion 21 acts as a second engagement portion 25 to be engaged with the first engagement claw 16. Further, as the first engagement claw 16 is located at opening portion 24, it can come into abutment with left-hand and right-hand peripheral side edge portions of the opening portion 24, thereby preventing a free rotation of the leg portion 14 relative to the cylindrical portion 22. As the first engagement claw 16 is located (engaged) within the opening portion 24 in the manner as described above, the relative rotation of the leg portion 14 with respect to the cylindrical portion 22 can be restricted while preventing the leg portion 22 from coming off from the cylindrical portion 22.

The top edge face of the cylindrical portion 22, that is, the edge face opposite to the second mounting engagement portion 21 acts as a second engagement portion 26 to be engaged with the second engagement claw 17. The top edge face of the cylindrical portion 22 is provided with a plurality (a total number of four corresponding to the second engagement claws 17 in this embodiment) of pressing portions 27 disposed at approximately equal intervals in the peripheral direction. The pressing portion 27 extends in the form of a tongue piece and its inner face (the face at the radially inner side of the cylindrical portion 22) assumes an inclining face 27a directed gradually outwardly in the radial direction of the cylindrical portion 22 as being directed toward the top edge of the cylindrical portion 22. The base end portion side of the inclining face 27a communicates smoothly with the inner face of the cylindrical portion 22.

In the first posture in which the leg portion 14 is inserted deeply into the cylindrical portion 22, the second engagement claw 17 is set so as to assume the position relationship in which it is inserted deeply into the pressing portion 27 as well as the second engagement portion 26. In the state in which the first engagement claw 16 is located in the opening portion 24, the second engagement claw 17 is located facing the second engagement portion 26, although it is deviated from the pressing portion 27 in the peripheral direction of the cylindrical portion 22 (the second engagement portion 26 being located on the virtual line extending in the axial direction in the cylindrical portion 22 of the second engagement claw 17).

Figure 20:
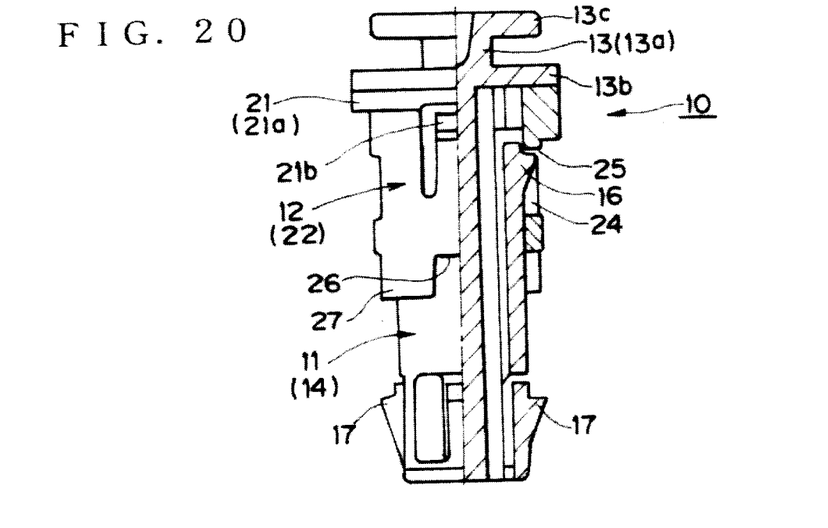
FIG. 20 is a partially sectional side view showing a state in which the pin member is inserted into the grommet member and showing a first posture in which the first engagement claw is engaged with the first engagement portion.
Figure 21:
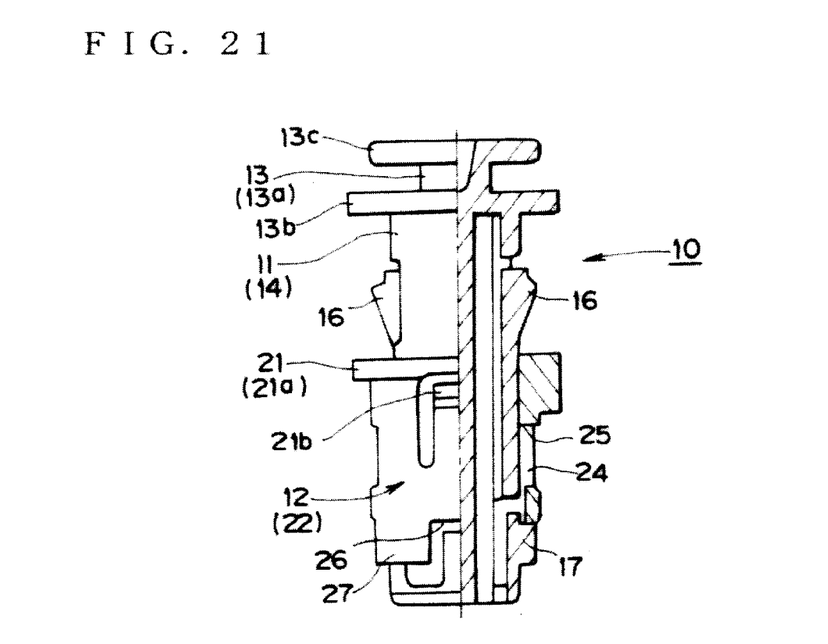
FIG. 21 is a partially sectional side view showing a state in which the pin member is inserted into the grommet member and showing a second posture in which the second engagement claw is engaged with the second engagement portion.
Figure 22:
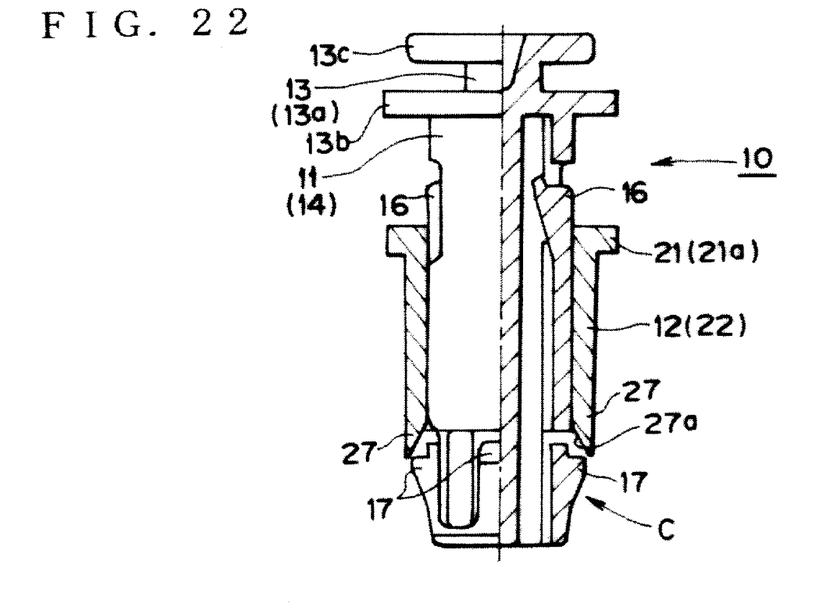
FIG. 22 is a view showing a state in which the pin member is inserted into the grommet member somewhat deeply from the state of FIG. 21 and rotated at 45 degree relatively thereto.
Figure 23:
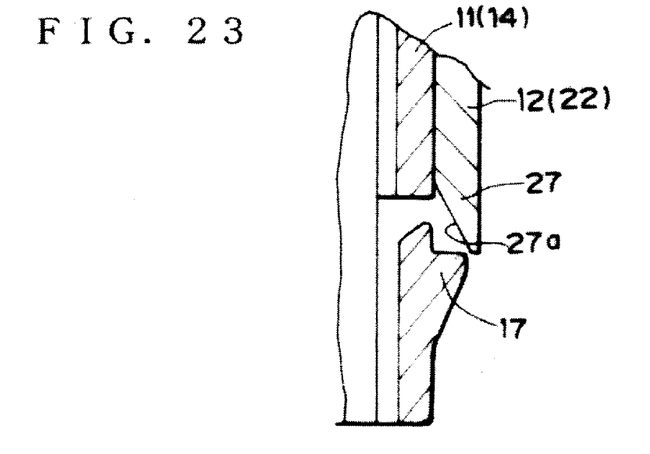
FIG. 23 is an enlarged view in section showing a portion indicated by arrow C in FIG. 22.

FIGS. 20 to 23 illustrate the state in which the leg portion 14 of the pin member 11 is inserted into the cylindrical portion 22 of the grommet member 12. FIG. 20 illustrates the first posture in which the leg portion 14 is inserted deeply into the cylindrical portion 22 (corresponding to FIG. 2), and FIG. 21 illustrates the second posture in which the leg portion 14 is inserted shallowly into the cylindrical portion 22 (corresponding to FIG. 3). FIG. 22 illustrates a state in which the pin member 11 is inserted somewhat deeply into the grommet member 12 and the second engagement claw 17 is rotated relative thereto at 45 degree from the state of FIG. 21 and then aligned with the pressing portion 27. In the first posture, the first engagement claw 16 is engaged with the first engagement portion 25 to prevent the leg portion 14 from coming off from the cylindrical portion 22 and to regulate the relative rotation. In the second posture in which the pin member 11 is inserted shallowly into the grommet member 12, the second engagement claw 17 is engaged with the second engagement portion 26 to prevent the leg portion 14 from coming off from the cylindrical portion 22.

The force of engagement of the first engagement claw 16 with the first engagement portion 25 is set to become smaller than the force of engagement of the second engagement claw 17 with the second engagement portion 26. More specifically, the expansion pressure of the air bag 31 to be developed acts as a force that pulls the leg portion 14 out from the cylindrical portion 22. As the force (approximately 10 kgf in this embodiment) produced by the expansion pressure is applied, the engagement of the first engagement claw 16 with the first engagement portion 25 is released. In other words, the first engagement claw 16 is elastically transformed inwardly in the radial direction of the leg portion 14 and the first engagement claw 16 is allowed to come off from the cylindrical portion 22, while the second engagement claw 17 is then engaged with the second engagement portion 26 to thereby prevent the leg portion 14 from coming off from the cylindrical portion 22. This means that the force of engagement of the second engagement claw 17 with the second engagement portion 26 is set to be too strong (set to compete with the engagement by the force of approximately 40 kgf in this embodiment) to release the engagement that can otherwise be released by the force approximating to the expansion pressure of the air bag 31. It is to be noted herein that, although the engagement force as described above can be set at different levels, there can also be adopted appropriate techniques known to the art which can set, for example, the difference in the number of the engagement claws (the difference in engagement areas) or the difference in readiness of elastic transformation, or the likelihood to release the engagement by inclining the face at which the engagement claw abuts with the engagement portion or the unlikelihood to release the engagement without inclining the face of abutment of the engagement claw with the engagement portion. Further, it is to be noted that once the grommet member 12 is mounted on the inner panel 5 by rendering largest the force of engagement of the mounting engagement claw 21b for mounting the grommet member 12 on the inner panel 5, the mounted state is kept as intact.

When the second engagement claw 17 is engaged with the second engagement portion 26, the base end part of the pressing portion 27 is set to be located inwardly in the radial direction of the cylindrical portion 22 than the second engagement claw 17 that is located in the free state in which no external force in the radial direction of the cylindrical portion 22 is applied. This regulates the rotation of the leg portion 14 relative to the cylindrical portion 22. When the second engagement claw 17 is engaged with the second engagement portion 26, the inner face of the top edge portion of the inclining face 27a is set to be located slightly outside in the radial direction of the cylindrical portion 22 with respect to the second engagement claw 17 that is placed in the free state where no external force in the radial direction of the cylindrical portion 22 is applied (see FIG. 23, too). This permits the second engagement claw 17 to be located on the axis identical to that of the pressing portion 27, if the leg portion 14 is inserted somewhat deeply into the cylindrical portion 22 from the state of engagement of the second engagement claw 17 with the second engagement portion 26 and the leg portion 14 is rotated at a predetermined angle (approximately 45 degree) relative to the cylindrical portion 22. By pulling the leg portion 14 out in this state, the second engagement claw 17 is allowed to be elastically transformed gradually inwardly in the radial direction of the cylindrical portion 22 by means of the inclining face 27a of the pressing portion 27 and then accommodated completely in the cylindrical portion 22. Finally, the leg portion 14 is pulled out thoroughly from the cylindrical portion 22.

Then, a description will be given regarding the way of using the holding device 10 by making reference to the mounting and detaching of the garnish 4. First, as preparatory procedures, the pin member 11 is mounted on the bracket 8 of the garnish 4 to engage the first mounting engagement portion 13 with the mounting hole 15, and the grommet member 12 is mounted on the inner panel 5 to engage the second engagement portion 21 with the mounting hole 23. In this state, the leg portion 14 of the pin member 11 is inserted deeply into the cylindrical portion 22 of the grommet member 12 to assume the first posture (the position in which the first flange part 13b of the pin member 11 abuts with the flange part 21a of the grommet member 12; corresponding to the position of FIG. 2). At this time, the first engagement claw 16 is engaged with the first engagement portion 25 and the first posture is maintained.

If the air bag apparatus 30 would be operated upon a side collision of the vehicle and the air bag 31 be developed, an external force would act on the pin member 11 in the direction in which the pin member 11 is released from the grommet member 12 upon receipt of the expansion pressure of the air bag. At this time, the engagement of the first engagement claw 16 with the first engagement portion 25 is released while the second engagement claw 17 is engaged with the second engagement portion 26 to assume the second posture. In the second posture, the garnish 4 is caused to be apart from the inner panel 5 to some extent to form a clearance S between the garnish 4 and the inner panel 5 and the air bag 31 is then allowed to develop through the clearance S into the cabin compartment of the vehicle.

When the air bag apparatus 30 has to be exchanged after it has been operated or it has to be subjected to maintenance or inspection, the garnish 4 can be detached from the inner panel 5. The detachment of the garnish 4 is effected first by detaching the garnish 4 from the pin member 11 in the second posture as shown in FIGS. 2 and 21. Thereafter, the pin member 11 is inserted slightly deeply into the grommet member 12 and then subjected to relative rotation at approximately 45 degree, thereby locating the second engagement claw 17 on the identical axis of the pressing portion 27. When the pin member 11 is to be relatively rotated in the manner as described above, the rotation of the grommet member 12 is regulated by the action of the protrusion portion 21c. Thereafter, the pin member 11 is pulled out from the grommet member 12. In other words, the pin member 11 is pulled out in the state in which the second engagement claw 17 is elastically transformed inwardly in the radial direction of the cylindrical portion 22. In order to re-mount the garnish 4 on the inner panel 5, the pin member 11 is mounted on the garnish 4 and then inserted deeply into the grommet member 12.

Although the present invention has been described by way of the above embodiments, it is to be understood that the present invention is interpreted as encompassing various modifications including the following embodiments. As the vehicle body panel on which the garnish 4 can be mounted, there may be appropriately selected, for example, from a center pillar, a rear pillar, a roof side rail and so on, in addition to the front pillar 1. In particular, it is preferred to apply the garnish 4 to the vehicle body panel in which the air bag developing along the window extending in a generally vertical direction is accommodated. As a matter of course, the air bag is not limited to only the case where it is developed along the window. The attachment of the garnish 4 by means of the holding device 10 may be effected only at a position in the vicinity of the air bag apparatus 30 (at one position or at plural positions, including a position of fixing with a screw), or the holding device 10 may be used at all the sites where the garnish is fixed.

In the second posture in which the second engagement claw 17 is engaged with the second engagement portion 26, the second engagement claw 17 can be set to be elastically transformable inwardly in the radial direction of the cylindrical portion 22 by means of the pressing portion 27 by rotating the pin member 11 relative to the grommet member 12 at a predetermined angle. In this case, for example, at least one of the side faces out of the side faces at which the pressing portion is located opposite to the second engagement claw 17 may be selected as the inclining face and the second engagement claw 17 may be set to be gradually transformed elastically inwardly of the cylindrical portion 22 along the inclining face, upon the relative rotation. It is to be understood herein as a matter of course that the object of the present invention is not limited to only those described above and is interpreted as encompassing any substantially preferred modifications and those impliedly described as having advantages within the spirit and scope of the invention.

What is claimed is:

1. An air bag apparatus for use with a vehicle, having an air bag for expanding into a cabin compartment of the vehicle through a clearance for allowing a passage of said air bag, comprising:

said air bag disposed in a vehicle body panel at the cabin compartment side; and a garnish disposed covering said air bag from the cabin compartment side; and a holding device for holding said garnish in a first posture in which said garnish assumes a predetermined mounted state where said garnish approaches to said vehicle body panel and a second posture in which the garnish forms a clearance relative to said vehicle body panel in response to expansion pressure of said air bag; wherein:

said holding device comprises a pin member and a grommet member;

said pin member has a first mounting engagement portion detachably engageable with said garnish and a leg portion extending integrally from the first mounting engagement portion;

said grommet member has a cylindrical portion receiving said leg portion and a second mounting engagement portion formed integrally in said cylindrical portion and mountable on said vehicle body panel;

said leg portion is provided with a first engagement claw and a second engagement claw, which are disposed apart from each other in an axial direction of said leg portion;

said cylindrical portion is further provided with a first engagement portion engageable with said first engagement claw to offer an action of preventing said leg portion from coming off from said cylindrical portion in a state in which said leg portion is inserted deeply to assume said first posture;

said cylindrical portion is further provided with a second engagement portion engageable with said second engagement claw to offer an action of preventing said leg portion from coming off from said cylindrical portion in a state in which said leg portion is inserted shallowly to assume said second posture;

a force of engagement of said first engagement claw with said first engagement portion is set to be smaller than a force of engagement of said second engagement claw with said second engagement portion, and the engagement of said first engagement claw with said first engagement portion is arranged to be released as said garnish receives a force of separating apart from said vehicle body panel by means of expansion force of said air bag upon operation of said air bag apparatus, while said second posture is set to be maintained by engagement of said second engagement claw with said second engagement portion; and said second engagement claw is detachably engaged with said second engagement portion.

2. The air bag apparatus as claimed in claim 1, wherein disengagement of said second engagement claw with said second engagement portion is effected by a relative rotation of said pin member with respect to said grommet member at a predetermined angle.

3. The air bag apparatus as claimed in claim 2, wherein:
said second engagement claw is set to be elastically transformable in the radial direction of said cylindrical portion; and said cylindrical portion is provided with a pressing portion that acts on said second engagement claw to elastically transform said second engagement claw inwardly in the radial direction of said cylindrical portion, when said relative rotation is effected.

4. The air bag apparatus as claimed in claim 2, wherein:
said first engagement claw is formed in a position close to said first mounting engagement portion and second engagement claw is formed in a position remote from said first mounting engagement portion;

each of said first engagement claw and said second engagement claw is set to be elastically transformable in the radial direction of said cylindrical portion;

said cylindrical portion is provided with an opening at a side face thereof at which said first engagement claw is located in the first posture and a given inner peripheral edge portion of said opening, which is located at the side of said second mounting engagement portion, constitutes said first engagement portion;

a given end face of said cylindrical portion on the side opposite to said second mounting engagement portion constitutes said second engagement portion;

said cylindrical portion is provided with a pressing portion in a tongue-shaped form extending from the given end face to an edge of said cylindrical portion;

an inner face of said pressing portion forms an inclining face inclining gradually toward outside in the radial direction of said cylindrical portion as said pressing portion approaches to the edge of said cylindrical portion; and an edge portion of said inclining face is set to be located outside said second engagement claw in the radial direction of said cylindrical portion, and said second engagement claw is set to be elastically transformable inwardly in the direction of said cylindrical portion by means of said inclining face as said leg portion is pulled out from said cylindrical portion by means of said relative rotation in a state in which said second engagement claw is aligned with said pressing portion.

5. The air bag apparatus as claimed in claim 4, wherein:
a base end portion of said inclining face is located inside said second engagement claw in the radial direction of said cylindrical portion, and said relative rotation is restricted by abutment of said second engagement claw with said pressing portion in a state in which said second engagement claw is engaged with said second engagement portion; and said relative rotation can be effected in a state in which said leg portion is inserted into said cylindrical portion slightly deeply from a state in which said second engagement claw is engaged with said second engagement portion.

6. The air bag apparatus as claimed in claim 4, wherein:
the relative rotation of said leg portion with respect to said cylindrical portion is restricted by abutment of said first engagement claw with a peripheral side edge part of the opening portion as said first engagement claw is located within the opening portion; and said second engagement claw is located facing said second engagement portion and said second engagement claw is disposed in a position in which said second engagement claw is deviated from said pressing portion in a peripheral direction of said cylindrical portion in a state in which said first engagement claw is located within the opening portion.

7. The air bag apparatus as claimed in claim 1, wherein said first mounting engagement portion is disposed so as to be detachable from said garnish by sliding in a direction crossing said garnish in an axial line of said leg portion.

8. The air bag apparatus as claimed in claim 7, wherein:
said first mounting engagement portion comprises a first flange part, a second flange part located astride said first flange portion at a position opposite to said leg portion and a neck part connecting said first flange part to said second flange part;

said garnish is provided with a mounting hole for said first mounting engagement portion;

said mounting hole comprises a larger-sized cavity portion and a groove portion communicating with the larger-sized cavity portion;

the larger-sized cavity portion is set to be large enough to insert said second flange part of said first mounting engagement portion thereinto;

the groove portion is set to be large enough to allow no insertion of the second flange part of said first mounting engagement portion yet to allow insertion of the neck part thereof; and said pin member is brought into a mounted state in which said garnish is clamped with said first flange part and said second flange part by locating the neck part in the groove portion by sliding said pin member with respect to said garnish after inserting the second flange part into the larger-sized cavity portion.

9. The air bag apparatus as claimed in claim 1, wherein:

said leg portion comprises a cylindrical outer wall part, a central shaft part located in the cylindrical outer wall part, a plurality of rib parts each extending radially from the central shaft part and connecting the cylindrical outer wall part to the central shaft part, and a hollow part disposed among the cylindrical outer wall part, the central shaft part and the rib parts; and said first engagement claw and said second engagement claw are formed each at a position of the cylindrical outer wall part corresponding to the hollow part.

10. The air bag apparatus as claimed in claim 2, wherein said second mounting engagement portion is mounted on said vehicle body panel in a state in which the rotation around an axial line of said grommet member is restricted.

11. The air bag apparatus as claimed in claim 10, wherein:

a mounting hole formed in said vehicle body panel for use with said second mounting engagement portion comprises a main cavity portion for insertion of said cylindrical portion and an engagement cavity portion formed in a predetermined position in a peripheral direction of the main cavity portion; and said second mounting engagement portion comprises a flange part having a size not large enough to allow an insertion into the main cavity portion, and a protrusion portion for preventing rotation which is integrally formed in the flange part and which is to be inserted into the engagement cavity portion when said cylindrical portion is inserted into the main cavity portion.

12. The air bag apparatus as claimed in claim 1, wherein:

said cylindrical portion is disposed to be inserted into the mounting hole for use with said second engagement portion formed in said vehicle body panel;

said second mounting engagement portion has a flange part and a mounting engagement claw, the flange part having a size that does not allow insertion into the main cavity portion and the mounting engagement claw being disposed on a side face of said cylindrical portion so as to be elastically transformable in the radial direction of said cylindrical portion; and the mounting engagement claw is disposed to eventually clamp said vehicle body panel in association with the flange part by inserting said cylindrical portion into the mounting hole while elastically transforming said cylindrical portion inwardly in the radial direction of said cylindrical portion upon insertion into the mounting hole.

13. The air bag apparatus as claimed in claim 1, wherein:

said pin member has a flange part at a base end part of said leg portion;

said grommet member has a flange part at a base end part of said cylindrical portion; and the flange part of said pin member comes into abutment with the flange part of said grommet member to restrict a deeper insertion of said leg portion into said cylindrical portion when said pin member is in the first posture in which said leg portion of said pin member is inserted deeply in said cylindrical portion.

14. The air bag apparatus as claimed in any one of claims 1 to 13, wherein a number of said first engagement claws and said first engagement portions corresponding to said first engagement claws are set to be larger than a number of said second engagement claws and said second engagement portions corresponding to said second engagement claws.

15. The air bag apparatus as claimed in any one of claims 1 to 13, wherein each of said pin member and said grommet member is made of a synthetic resin.

\* \* \* \* \*